United States Patent [19]

Meyer

[11] Patent Number: 4,664,905

[45] Date of Patent: * May 12, 1987

[54] METHOD OF FEEDING CATTLE TO IMPROVE PROTEIN UTILIZATION

[75] Inventor: Edwin W. Meyer, Chicago, Ill.

[73] Assignee: Central Soya Company, Inc., Fort Wayne, Ind.

[ * ] Notice: The portion of the term of this patent subsequent to May 12, 2004 has been disclaimed.

[21] Appl. No.: 523,653

[22] Filed: Aug. 15, 1983

Related U.S. Application Data

[63] Continuation-in-part of Ser. No. 435,697, Oct. 21, 1982, abandoned.

[51] Int. Cl.$^4$ .............................................. A23K 1/00
[52] U.S. Cl. ........................................ 426/2; 426/74; 426/630; 426/807
[58] Field of Search ................ 426/74, 802, 104, 623, 426/630, 634, 807, 656, 646; 430/113, 123.5

[56] References Cited

U.S. PATENT DOCUMENTS

| | | | |
|---|---|---|---|
| 1,732,015 | 10/1929 | Homberg et al. | 106/124 |
| 2,295,643 | 9/1942 | Emery | 99/2 |
| 3,035,920 | 5/1962 | Knodt | 426/74 |
| 3,463,858 | 8/1969 | Anderson . | |
| 3,911,159 | 10/1975 | Heusdens | 426/802 X |
| 3,941,818 | 3/1976 | Abdel-Monem . | |
| 4,021,569 | 4/1977 | Abdel-Monem . | |
| 4,172,072 | 10/1979 | Ashmead | 260/2 |
| 4,186,213 | 1/1980 | Burroughs et al. | 426/2 |

FOREIGN PATENT DOCUMENTS 2704746 2/1977 Fed. Rep. of Germany .
891055 12/1981 U.S.S.R. .

OTHER PUBLICATIONS

Britton et al., "Effect of Complexing Na bentonite with Soybean Meal or Urea in vitro Ruminal Ammonia Release & Nitrogenutilzation in ruminants" Chem. Abst. vol. 89, 145567n.
Lantzsch et al., "Studies on the determination of zine availability" Chem. Abst. vol. 92, (1980) Abst. No. 196689y.
Smith et al., "Soybeans Chemistry & Technology", Air Publishing Co. 1972 pp. 184–186.
Britton et al., (1978), J. Anim. Sci. 46: 1738–1747.
Lantzch et al., (1979), Uebers, Tierernaehr 7(2): 185–188.
Lease and Williams (1967), Poultry Science, 46: 233–241.
Tagari et al., (1962), Brit. J. Nutr., 16: 237–243.
Schugel, "The Rule of Zinc Methionine," etc., Zinpro Corporation Technical Bulletin (Undated).
Zinpro Corporation Technical Bulletins for "Zinpro 40," Zinpro 100, and Zinpro 200 (Undated).
Miller et al., (1965) J. Dairy Sci., 48: 450–453.
Chalmers et al., (1954) J. Agr. Sci., 44: 254–262.
"Mineral Tolerance of Domestic Animals" (1980, National Academy of Sciences) "Zinc," pp. 553–577.
Ott et al., J. Anim. Sci. (1966) 25: 414–438.

Primary Examiner—R. B. Penland
Attorney, Agent, or Firm—Allegretti, Newitt, Witcoff & McAndrews, Ltd.

[57] ABSTRACT

This invention is concerned with improvement in the nutritive value of soybean meal and other oil seed proteinaceous meals for feeding cattle. The improvement is accomplished by treating the meals with a water-soluble zinc salt to provide zinc ions for reaction with the protein. The treatment reduces the rumen digestibility of the protein of the meal and thereby improves its nutritive value.

14 Claims, 1 Drawing Figure

METHOD OF FEEDING CATTLE TO IMPROVE PROTEIN UTILIZATION

RELATED APPLICATION

This application is a continuation-in-part of my copending application Ser. No. 435,697, filed Oct. 21, 1982, now abandoned.

BACKGROUND AND PRIOR ART

The field of this invention relates to improving the nutritive value of soybean meal and other vegetable seed proteinaceous meals for feeding to ruminants. More particularly, the invention is concerned with methods of protecting the protein of vegetable seed meals from rumen digestion, and with the nutritionally improved seed meals resulting from such rumen-protection.

It has been recognized for some that the protein-providing feed materials which are subject to digestion in the rumen are thereby deleteriously altered in their feeding value. It has been proposed that ideally the protein component of the ruminant feed should be "protected" against being solubilized or metabolized in the rumen, passing therethrough in substantially undegraded form, while remaining digestable and metabolizable in the post-rumen digestive system of the cattle or sheep. The development of a practical way for applying this concept to ruminant nutrition has proven difficult. U.S. Pat. No. 3,619,200 proposes the application to the vegetable meal or other proteinaceous ruminant feed material of a rumen resistant coating. The purpose of the coating is to protect the proteinaceous feed from microbial attack in the rumen while decomposing and permitting digestion of the feed within the abomasum and small intestine.

It is also known that the solubility of protein in ruminant feed materials can be reduced by treating the feed materials with tannin, formaldehyde, or other aldehydes. In addition, a reduction in protein solubility can be obtained by heating the protein. These procedures are summarized with literature references thereto in U.S. Pat. No. 4,186,213. Feed materials which may be treated by one or more of these procedures to reduce the solubility of the protein in the rumen and to protect against rumen destruction are disclosed as including various vegetable meals.

With reference to feeding value lost by rumen destruction, soybean meal has a relatively low protein efficiency value. See Klopfenstein, *Feedstuffs*, July, 1981, 23-24. Since soybean meal is one of the major protein-containing feed materials used with ruminants, it is particularly desirable to provide a commercially practical means for protecting soybean meal against rumen destruction while leaving the protein thereof subject to post-rumen digestion and metabolism. For large scale commercial use such a method must be simple, efficient, and of relatively low cost. Such a method should be capable of being integrated with present commercial processing of soybeans to produce soybean feed materials.

Other prior art references of interest are:
Hudson et al (1970), *J. Anim. Sci.*, 30: 609-613
Tagari et al (1962), *Brit. J. Nutr.*, 16, 237-243
Anderson, U.S. Pat. No. 3,463,858 (1969)
Emery et al, U.S. Pat. No. 2,295,643 (1942)
Ashmead, U.S. Pat. No. 4,172,072 (1979)

Hudson et al describe an experimental comparison in lambs of postruminal nitrogen utilization of commercial soybean meal (72% N soluble) with meal heated 4 hours at 140° C. (35% N soluble). The results suggest that the heated meal was degraded at a slower rate by ruminal microorganisms.

Tagari et al compared solvent extracted soybean meals of different heat exposures. These included room temperature solvent removal, solvent removal at 80° C. for 10 minutes, and commercial toasted meal steamed at 120° C. for 15 minutes. The meals were fed to rams and rumen liquor samples were tested. Artificial rumen comparisons for ammonia liberation were also made. It was concluded the results clearly showed "that the main factor determining the different efficiencies of process to non-process soybean meals is their different solubility in rumen liquor." It was also observed that changes in solubility caused by different heat treatments of soybean meal are relatively large in comparison with other meals.

Anderson discloses a procedure for preparing a growth factor for feeding domestic animals and poultry. A zinc salt in aqueous solution such as zinc chloride or zinc sulfate, is reacted with free amino acids in a preteinacous feed material. The reaction is carried out in an aqueous solution at a temperature of 60°-70° C. (140°-158° F.), and a pH of 3.5, which pH is said to be achieved automatically with $ZnCl_2$, an adjustment of pH with HCl being used with other zinc salts. The reaction mixture is dried to a moisture content of 2-8%, and mixed with the feed ration. There is no reference to the feeding of ruminants, or to rumen protection of protein.

Emery et al describes a process in which mineral compounds including zinc and other polyvalent metal oxides, hydroxides, and salts are reacted with proteinaceous feed materials in the presence of water and a protein splitting acid such as $H_3PO_4$, HCl, or $H_2SO_4$. The reacted mixture is dried by heating in air. Soybean meal is indicated as the preferred feed material and zinc is among the metals referred to for use in the form of oxides, hydroxides, or carbonates. Other salts, such as cobalt, are indicated as being used in the form of chlorides or sulfates. The examples illustrate the reaction of large amounts of the metal compounds with soybean meal (Ex. I, 35% and Ex. III, 17%, based on the meal). There is no reference in this patent to either rumen protection or nutritional value.

Ashmead proposes the use of metal proteinates for supplying mineral deficiencies in humans and animals. The proteinates are prepared by reacting bivalent metal salts at an alkaline pH with free amino acids of enzyme-hydrolyzed proteins.

SUMMARY OF INVENTION

During experimental work leading to the present invention, it was discovered that zinc salts, such as zinc chloride and zinc sulfate can be used as chemical reagents for reducing the rumen digestability of proteinaceous defatted vegetable seed meal such as soybean meal. The protective effect of the zinc salt reagent (viz. zinc chloride) is particularly evident with soybean meal because of its high degree of susceptibility to degradation in the rumen. A zinc salt solution can be applied to the feed material and mixed therewith to cause the solution to be absorbed by the feed material. This brings the zinc ion into intimate contact with the protein of the feed material. The protective effect is enhanced when the meal with the absorbed zinc salt is heated. The heating is believed to promote the reaction of the zinc ion with the protein. This process is simple and efficient, and lends itself to being carried out in conjunction with standard processing operations for ruminant feed meals including particularly the standard processing operations for soybean meals. These and other aspects of the invention will be described in detail in the following specification.

DRAWING

The accompanying drawing is a diagramatic flow sheet illustrating one way in which the method of this invention can be incorporated in commercial processing of soybean meal to produce a protected soybean meal feed material for ruminants.

DETAILED DESCRIPTION

Figure 1:
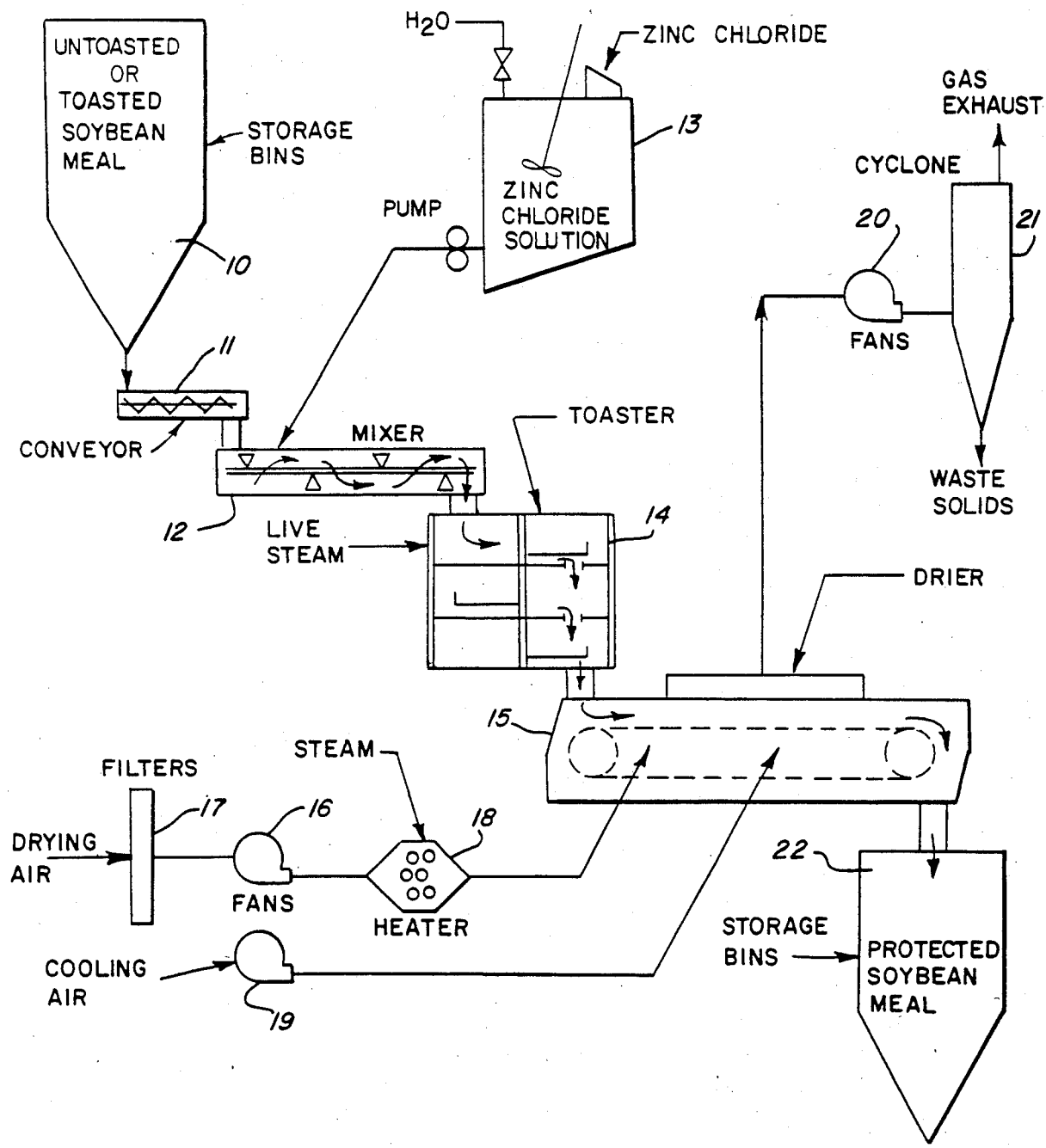

The method of this invention may be practiced with any proteinaceous defatted vegetable seed meal, or related seed material, such as brewer's grains or distillers grains which are by-products of fermentation of barley, corn, and other seed grains. Such meals include soybean meal, cottonseed meal, peanut meal, sunflower meal, Canola (rapeseed) meal, palm kernel meal, and other high-protein defatted seed meals and mixtures thereof. The method of this invention is especially advantageous when applied to defatted soybean meal. The meal may be either in the form of untoasted white flakes or toasted meal as currently produced. Based on present data, the use of toasted soybean meal as the starting material is preferred.

The desired reaction is between the vegetable protein and the zinc reagent, but the nature of this reaction is not known with certainty. The meal does not need to contain free amino acids (FAA). Free amino acids present are believed to be immaterial to the process. Vegetable meals and other proteinaceous defatted vegetable seed materials for use in the method of this invention will ordinarily not contain over 5% FAA, and most vegetable seed meals such as soybean meal will contain less than 1% FAA, based on FAA weight per dry weight of the meal.

The zinz treating agent is preferably zinc chloride or sulfate, but other ruminant-edible water-soluble zinc salts can be used, such as zinc acetate. It appears that complete dissolving of the zinc salt, although preferred, is not essential to obtain a substantial benefit. Further, the water-soluble zinc salt may be formed in situ, such as by the addition of ZnO and HCl to form $ZnCl_2$. In one procedure, the zinc ions of the salt are brought into intimate contact with the protein of the meal which is subject to rumen degradation. This may be accomplished by applying the zinc salt in an aqueous solution, which is mixed with the meal and absorbed thereby. Alternatively, the zinc salt can be dry mixed with the meal. Sufficient moisture may be present in the meal or added thereto to dissolve a substantial amount of zinc salt.

The contacting of the zinc reagents with the meal may be carried out so that the meal contains an aqueous solution of the zinc salt and the zinc ions thereof are in intimate contact with the protein of the meal. The concentration of the aqueous solution is not critical, but it is preferred to apply the zinc salt in a relatively concentrated aqueous solution to minimize the amount of moisture that will need to be removed by a drying operation on completion of the treatment. For example, soybean meal may have a storage moisture content in the range from about 10-13%. The aqueous solution of the zinc salt may be applied in an amount of water increasing the moisture content of the soybean meal to the range of about 15-25%. On completion of the treatment, the meal can then be dried back to a storage moisture content, such as 10-13%.

The amount of zinc salt solution applied to the meal can be limited to an amount which can be absorbed by the meal so that there is a minimum of free solution on completion of the mixing. For example, zinc chloride may be applied to soybean meal or other vegetable meal in concentrations ranging from 1 to 50%. Only sufficient moisture need be present to dissolve the zinc salt and permit its absorption by the meal. However, it is preferred to use an amount of solution which provides good distribution for the zinc salt while at the same time avoiding an excess amount over that which can be readily absorbed by the feed material, thereby reducing the amount of water that will need to be evaporated in the final drying operation. If the meal contains sufficient moisture or water is to be added separately, such as by condensing steam in the meal, the zinc reagent in powder form may be blended with the meal.

When zinc chloride is the reagent employed from 0.6-2.7% of the zinc salt can be used based on the dry weight of the meal being treated. Corresponding molar equivalent amounts of other zinc salts can be used. A preferred range is from 0.8-2.2% based on zinc chloride and the dry weight of the meal. More generally, on a zinc element or zinc ion basis, the zinc salt may be used in an amount corresponding to 0.25-1.3% zinc based on the dry weight of the meal, and preferably from 0.4-1.10% zinc on the same basis. Higher level of zinc can be used but are not needed. Large excesses of zinc should be avoided. The zinc salts should not be used in amounts which are toxic to ruminants or which produce toxic residues in carcasses of meat-producing ruminants, or in the milk of milk producing ruminants. Meal dry weight refers to the oil and moisture free weight of the meal.

The zinc reagent may be reacted with the meal without pH adjustment. However, if the resulting mixture has an acidic pH below the isoelectric point (IP) of the meal, it is believed that the reaction of the zinc ions with the protein may be improved by adding a basic reagent, such as sodium hydroxide, to raise the pH. For example, the protein component of soybean meal is the acid-precipitable globulins, which have average IP's of about 4.5-4.6. Therefore, it is preferred to react the zinc reagent with soybean meal at a pH above 4.6, such as a pH from 6.4 to 6.9.

The initial mixing of the zinc salt solution with the meal and its absorption can be carried out at ordinary room temperatures (viz. 60°-90° F.) More broadly, this step can be carried out at temperatures ranging from 35° to 200° F. Preferably, however, heat is not applied during the initial mixing and absorption, and therefore mixing temperatures above 100° F. will ordinarily not be employed.

The mixing, absorption, and intimate contacting of the zinc salt or zinc salt solution with the protein apparently causes the zinc to react with the protein in such a way as to protect the protein against rumen destruction. It appears that the desired reaction may be completed later by further dissolving of zinc salt added as a powder. However, the mechanism involved is not known with certainty. Available evidence indicates that the desirable reaction, which is believed to be the reaction of the zinc ions with the protein, can be promoted by heating the feed material after it has absorbed the zinc chloride solution. For example, the heating can be carried out at a temperature above ordinary room temperature such as at least about 100° F. but below a temperature at which the protein is degraded. One advantageous temperature range is from 200° to 230° F. The heating of soybean meal with the absorbed zinc salt solution can be carried out at the same temperature as presently used for toasting soybean white flakes, that is, from about 200° to 225° F., and a heating time of from 10 to 30 minutes. In producing pelleted feeds the mix is heated before and during extrusion but lower temperatures are used, such as temperatures in the range of 120° to 160° F.

The method of this invention can be integrated with the standard commercial processing of soybean meal. Presently, untoasted soybean flakes which have been subjected to solvent extraction to remove the soybean oil are further processed to remove the solvent and to "toast" the flakes. The untoasted flakes are referred to in the trade as "white flakes". Patents describing processes for producing such white flakes, and their further processing to remove the solvent and to toast the flakes are: U.S. Pat. Nos. 3,268,335, 2,710,258, and 2,585,793. The method is applicable to defatted untoasted soybean flakes as well as to toasted soybean meal.

A spray-blending procedure may be employed for combining the aqueous solution of the zinc salt with the vegetable meal. Various techniques may be used. One simple method is to batch blend the meal in a ribbon blender fitted with one or more spray nozzles, a solution supply tank for the zinc salt solution, and an appropriately sized pump. As the blending proceeds, the applied solution is absorbed by the meal. Subsequent to the blending, the meal containing the absorbed salt solution is subjected to a heat treatment, as described above, and subsequently illustrated in greater detail.

The flow sheet comprising FIG. 1 of the drawing illustrates how the method of this invention can be applied to the commercial processing of soybean meal. As shown, untoasted defatted soybean meal (white flakes) can be held in a storage bin 10. Alternatively, toasted soybean meal as produced commercially can be held in the storage bin 10 for processing.

The untoasted or toasted soybean meal is passed from the storage bin 10 out a bottom downwardly tapered outlet to a conveyor 11 for introduction into the feed end of a mixer 12. Adjacent the feed end of the mixer 12, there is provided an inlet, comprising a series of spray heads, to which is pumped the zinc chloride solution, such as a 10% zinc chloride solution, as prepared in the solution mixer chamber 13. The zinc chloride solution is gradually applied as the meal moves through the mixer 12, the proportions being controlled to about 1 part of solution per part of soybean meal. By the time the meal reaches the discharge end of the mixer, the solution has been absorbed by the flakes, and the meal with the absorbed solution is ready for further processing in the toaster apparatus 14. The solution treated meal is introduced into the top of the toaster apparatus 14 and discharged from the bottom thereof, as shown. The toaster may be equipped with a steam jacket into which live steam is introduced, and/or live steam may be introduced directly into the toaster to contact the meal and permit steam to condense on the particles of meal. These alternatives in the apparatus used are further described in U.S. Pat. No. 2,585,793. The residence time of the meal in the toaster 14 can range from about 10 to 30 minutes, such as 15 to 20 minutes, and the meal therein can reach a temperature of about 215°–220° F.

On discharge of the heated meal from the bottom of the toaster 14, it is passed into the fee end of a drier 15, which includes a conveyor to move the feed through the dryer as it is subjected to heated air. The drying air may be supplied to the feed end of drier 15 by means of fans 16 which draws in room air through filters 17, and passes the filtered air through indirect steam heaters 15. Preferably, as shown, drier 18 is arranged sot that the drying is completed by the time the meal reaches a midpoint in the drier. Means is provided for introducing cooling air into the midsection of the drier, such as fans 19, which draw in air at room temperature and pass it into the drier. The combined drying air and cooling air exits through a top outlet, being drawn from drier 15 by means of fans 20, and passed through a cyclone separator 21 for removal of waste solids before discharge of the gas to the atmosphere.

The heating of protein feed meals after defatting is commonly called "toasting". A description of toasting is given in Sipos and Witte; "The Desolventizer-Toaster Process for Soybean Oil Meal"; *J. of the Am. Oil Chem. Soc.*, 38, 11 (1961), and in Mustakas, Moulton, Baker, and Kwolek; "Critical Processing Factors in Desolventizing-Toasting Soybean Meal for Food"; *J. of the Am. Oil Chem. Soc.*, 58, 300 (1981). The treatment of other seed meals is described in A. M. Altschul, Editor; Processed Plant Protein Foodstuffs; Academic Press, New York, 1958. Based on present information it appears that the best rumen protection is obtained when the treatment of this invention is applied to defatted toasted high-protein vegetable meals, especially toasted soybean meal.

The method of the present invention and the results which can be obtained thereby are further illustrated by the following examples.

EXAMPLE I

Most of the experiments subsequently reported were performed on a single lot (15 tons) of commercial soybean meal. The purpose was to provide a constant source material for comparative testing. This commercial toasted soybean meal had the following composition: Moisture—10.64%; Protein (N×6.25)—50.86% Crude Fiber—3.00%; Ash—5.78%; and Nitrogen Solubility Index—8.5% (Official Methods of the American Oil Chemists Society).

In a typical experiment, ten pounds of the standard soybean meal with spray blended in a small ribbon blender fitted with a spray nozzle and feed supply. For spraying, the salts were dissolved in one liter of water (approximately) two pounds). The spray blending took about ten minutes. The moist mass was transformed to the pilot desolventizer-toaster unit (DT) and heated with stirring at 200° F. and over (internal temperature) for fifteen minutes. The moist heat-treated meals were then dried in a forced draft oven for ninety minutes at 180° F. to achieve a stable moisture content for adequate storage.

In the following tables, the level of salt treatment is stated as percent of salt based on weight of the standard soybean meal with 10.64% moisture. The standard soybean meal (Control SBM) was used as the control.

The analytical data reported in the following tables include:

(1) ADIN. Acid detergent insoluble nitrogen (ADIN) determination has been described by Goering et al., "Analytical Measures of Heat Damaged Forage and Nitrogen Digestibility", Annual Meeting of the ADSA, Gainesville, Fla., June, 1970. See also *Forage and Fiber Analyses, Agricultural Handbook No.* 379, p. 11, ARS, USDA, Jacket No. 387–598. ADIN is a measure of the amount of nitrogen (protein) in a feedstuff which is unavailable to the animal for nourishment.

(2) $NH_3$ RELEASE (24 HRS.) Another useful evaluation method is that of ammonia release of the protein feedstuff in ruminal fluid in vitro (Britton et al., "Effect of Complexing Sodium Bentonite with Soybean Meal or Urea on in vitro Ruminal Ammonia Release and Nitrogen Utilization in Ruminants", *J. Anim. Sci.,* 46, 1738 (1978)). The greater the ammonia release, the greater the degradation of the protein in the rumen by the microbial enzymes. The released ammonia is either lost through rumen absorption and excreted through the kidneys and urinary excretion, or converted to microbial protein which may be lower in nutritional value than the original feed protein.

(3) ENZYME INDIGEST (2 HRS.) Enzyme indigestibility as shown by measuring the rate and extent of in vitro protein degradation by proteases is a very useful tool in evaluating the rumen by-pass potential of a given protein foodstuff. Suitable test procedures are described in the following references. Poos et al., "A Comparison of Laboratory Techniques to Preduct Ruminal Degradation of Protein Supplements", *J. Anim. Sci., Abstr.* 679, p. 379 (1980); and Rock et al., "Estimation of Protein Degradation with Enzymes", *J. Anim. Sci., Abstr.* 121, p. 118 (1981). The utility of enzyme degradation in vitro as a predictor of potential rumen degradation has been established by application to a series of standard protein supplements whose true rumen by-pass properties have been determined in cattle with abomasal fistulas.

The experiments reported below in Tables A and B show the potential of zinc salts, specifically zinc chloride and zinc sulfate, for rumen by-pass protection of high-protein vegetable meals, specifically toasted soybean meal and that the zinc salt treatment is reproducible. The columns headed "% of Control SBM" in these and subsequent tables refers to the percent of the enzyme indigestibility of the control soybean meal.

TABLE A

| SALT TREATMENT | ADIN | $NH_3$ RELEASE 24 HRS. | ENZYME INDIGEST 2 HRS. | % OF CONTROL SBM |
|---|---|---|---|---|
| CONTROL SBM | 2.15 | 37.58 | 19.73 | — |
| 0.5% $ZnCl_2$ | 2.06 | 38.70 | 27.61 | 139.9 |
| 1.0% $ZnCl_2$ | 2.24 | 28.87 | 33.73 | 170.9 |

TABLE B

| SALT TREATMENT | ADIN | $NH_3$ RELEASE 24 HRS. | ENZYME INDIGEST 2 HRS. | % OF CONTROL SBM |
|---|---|---|---|---|
| CONTROL SBM | 2.61 | 39.65 | 19.21 | — |
| 0.5% $ZnSO_4$ | 2.98 | 39.79 | 24.46 | 127.3 |
| 1.9% $ZnSO_4$ | 2.18 | 33.01 | 30.74 | 160.0 |

EXAMPLE II

In another series of trials following the procedure of Example I, the performance of zinc salts (zinc sulfate and zinc chloride) was further studied. The results as reported below in Table C show that the treatment, especially at the 1% level, will reduce the rumen digestibility of the soybean meal.

TABLE C

| SALT TREATMENT | ADIN | NH RELEASE 24 HRS. | ENZYME INDIGEST 2 HRS. | % OF CONTROL SBM |
|---|---|---|---|---|
| 1.0 $ZnSO_4$ | 2.50 | 26.32 | 26.80 | 145.7 |
| 1.0% $ZnSO_4$ | 2.31 | 28.88 | 28.55 | 155.2 |
| CONTROL SBM | 3.24 | 34.05 | 18.39 | — |
| 1.0% $ZnCl_2$ | 2.41 | 16.31 | 42.65 | 231.9 |
| 1.0% $ZnCl_2$ | 2.92 | 19.86 | 36.35 | 197.6 |
| 1.0% $ZnCl_2$ | 2.75 | 23.03 | 38.68 | 210.3 |
| 1.0% $ZnCl_2$ | 1.97 | 19.32 | 39.11 | 212.6 |

EXAMPLE III

In another series of trials following the procedure of Example I, zinc chloride was compared at 1% and 2% levels based on the weight of the meal (10.64% moisture), and in addition to the control comparison with the standard meal (CONTROL SBM), the standard meal was carried through the same heating process as the zinc chloride-treated meal to provide a further comparison (TOASTED CONTROL). The results are summarized below in Table D.

TABLE D

| SALT TREATMENT | ADIN | $NH_3$ RELEASE 24 HRS. | ENZYME INDIGEST 2 HRS. | % OF CONTROL SBM |
|---|---|---|---|---|
| 1.0% $ZnCl_2$ | 3.12 | 26.10 | 29.72 | 232.9 |
| 2.0% $ZnCl_2$ | 2.65 | 19.39 | 32.46 | 254.4 |
| TOASTED CONTROL | 2.82 | 36.21 | 11.95 | — |
| CONTROL SBM | 3.09 | 39.38 | 12.76 | — |

EXAMPLE IV

In an effort to determine the interaction of chemical level (zinc chloride), temperature, and time, ten pound samples of standard soybean meal were treated with 0, 1.0, and 2.0% of zinc chloride in 1000 ml of water each. Blending time was twenty minutes in each instance. Samples were heated in an autoclave for ten, twenty, and thirty minutes at 215°, 220°, 230°, 240°, 250°, and 260° F. The heated samples were then dried in aluminum trays in a forced draft oven at 180° F. to a stable moisture content (10–13%). The results of assaying these samples for non-degradable N (Enzyme Assay) are shown in Table E. The values are adjusted to reflect a value of 30% non-degradable N in the standard soybean meal.

The data indicates that in a given set of trials, heating or toasting for more than ten minutes at a given temperature does not result in significant improvement in non-degradability of the protein of the meal. At 0 and 1.0% zinc chloride, the improvement with increasing temperature is quite marked. At all temperatures, treatment with zinc chloride has a notable effect, and particularly, at temperatures up to about 230° F. or slightly above. This is important since higher temperatures are not readily achieved in conventional feed meal heat-treating (toasting) equipment. On a commercial scale, higher temperatures would result in higher equipment and energy costs.

At useful working temepratures and residence times, the data indicate that the optimum level of treatment is between 1.0 and 2.0% based on the meal with 10.64% moisture. On a dry meal basis this is equivalwent to 1.1 to 2.2% zinc chloride or to about 0.53 to 1.06% zinc.

TABLE E

THE INFLUENCE OF TEMPERATURE, TIME, AND LEVEL OF ZINC CHLORIDE TREATMENT ON THE ENZYMATIC NON-DEGRADABILITY* OF THE PROTEIN OF SOYBEAN MEAL

| TEMP (°F.) | TIME (MIN) | PERCENT ZINC CHLORIDE | | |
|---|---|---|---|---|
| | | 0 | 1.0 | 2.0 |
| 215 | 10 | 30.1 | 49.5 | 57.8 |
| 213 | 20 | 32.4 | 50.2 | 59.9 |
| 213 | 30 | 32.4 | 50.3 | 53.7 |
| 220 | 10 | 30.6 | 48.3 | 63.0 |
| 220 | 20 | 37.8 | 54.2 | 57.6 |
| 220 | 30 | 37.1 | 54.1 | 62.6 |
| 230 | 10 | 38.0 | 55.1 | 61.4 |
| 230 | 20 | 42.8 | 57.2 | 65.2 |
| 230 | 30 | 40.0 | 58.4 | 64.9 |
| 240 | 10 | 41.5 | 58.5 | 62.7 |
| 240 | 20 | 46.4 | 59.7 | 65.7 |
| 240 | 30 | 46.4 | 59.2 | 63.8 |
| 250 | 10 | 47.7 | 60.0 | 63.3 |
| 250 | 20 | 52.5 | 62.8 | 64.4 |
| 250 | 30 | 51.7 | 62.9 | 65.1 |
| 260 | 10 | 55.4 | 62.8 | 66.3 |
| 260 | 20 | 56.9 | 63.0 | 66.4 |
| 260 | 30 | 57.1 | 62.3 | 64.5 |

*Non-degradability indicated as % N remaining (dry matter basis) as compared to a standard SBM as 30% N non-degradable.

EXAMPLE V

The method of this invention may be used with other proteinaceous feed materials. In this experiment feed-grade peanut meal and corn gluten meal were chosen as substrates. These meals were treated with aqueous solutions of zinc chloride so as to achieve a 1.0 percent level of salt treatment. The meals were then heat-treated in a laboratory toaster at 200°–210° F. for twenty minutes. The treated meals were then dried at about 180° F. to a moisture content insuring stability (10–13%).

The treated feed meals and their untreated counterparts were evaluated by the enzyme indigestibility assay described previously. This assay has been shown to correlate with rumen bypass properties determined in vivo. The results are given in Table F.

TABLE F

| Product | Treatment | Enzyme[a] Indigest 2 Hrs. | % of Control Meal |
|---|---|---|---|
| Peanut Meal | None | 9.07 | — |
| Peanut Meal | 1.0% ZnCl$_2$ | 30.49 | 336 |
| Corn Gluten Meal | None | 74.53 | — |
| Corn Gluten Meal | 1.0% ZnCl$_2$ | 98.79 | 132.6 |

[a]Percent of original meal nitrogen remaining undigested after 2 hours of enzyme treatment.

The above data shows that the treatments have resulted in considerable improvement in the resistance to enzyme degradation. Even the corn gluten meal which is known to have good rumen bypass properties was improved. Peanut meal which is readily digested in the rumen showed a greater degree of benefit from the rumen bypass protection. Protein-containing feed ingredients for ruminants with good bypass properties wil be benefited to a lesser extent than those with poor bypass properties. Other examples of feed materials with poor bypass properties are cottonseed meal, sunflower meal, rapeseed meal, and Canola (low glucosinolate meal).

EXAMPLE VI

To further evaluate the benefits of the treatment of this invention, a growth trial was conducted on zinc chloride-treated soybean meal with young steers. Thirty-two Holstein steers previously on pasture and weighing 350–450 pounds were used. These were divided into 4 groups of 8 steers each and placed in separate pens. During a 14-day preliminary period, the steers were fed a low-protein (8% crude protein) standardized corn-soy diet in order to deplete their protein reserves. The soybean meal and diet protein content fed to the four groups were as follows: (1) 8% crude protein—regular soybean meal, (2) 8% crude protein—treated soybean meal, (3) 11% crude protein—regular soybean meal, and (4) 11% crude protein—treated soybean meal. The protein content of these diets is below the normal requirement of the animals (12.5–13.0%) in order to create protein stress. The treated soybean meal contained 2% zinc chloride and was heated at 220° F. for twenty minutes as previously described. The test diets were corn-soy diets containing the recognized macro and micro ingredients. Feed dry matter intake was controlled at 2.5% of body weight to reduce the rate of passage and intake as variables.

Initial weights were obtained just before the start of the trial, and intermediate weights were taken every 14 days. Feed was removed the afternoon before all weights were taken. Feed adjustments were made for each pen after body weights were obtained. The weight results were converted to an average daily gain figure for each test group.

The results of this trial are given in Table G.

TABLE G

| Days | Feed | Average daily gain, lbs. (ADG) |
|---|---|---|
| 14 | 8% crude protein-regular meal | −0.089 |
| | 8% crude protein-treated meal | −0.134 |
| | 11% crude protein-regular meal | −0.179 |
| | 11% crude protein-treated meal | +0.112 |
| 28 | 8% crude protein-regular meal | 0.49 |
| | 8% crude protein-treated meal | 0.51 |
| | 11% crude protein-regular meal | 0.53 |
| | 11% crude protein-treated meal | 0.64 |
| 42 | 8% crude protein-regular meal | 0.39 |
| | 8% crude protein-treated meal | 0.55 |
| | 11% crude protein-regular meal | 0.63 |
| | 11% crude protein-treated meal | 0.75 |

The data of Table G indicates that the treated soybean meal was superior to the regular meal, even under protein stress conditions. Considering the 11% crude protein diets, at 28 days the treated meal diet resulted in about a 21% increase in ADG over the regular meal diet; at 42 days the increase was 19%.

EXAMPLE VII

In a further experiment, four commercial toasted vegetable meals were used: soybean meal, rapeseed (Canola), cottonseed, and sunflower. Samples of the meals with and without ZnCl$_2$ treatment (1.5%) were heated on trays in an autoclave at 220° F. for 10 minutes. The moist-heat treated feedstuffs were dried to 180° F. for 2 hours to final moisture contents of 2–14%. ADIN and enzyme indigestibility tests were made according to procedures described previously. The results of the test are summarized below in Table H.

TABLE H

| | Estimated % Rumen Bypass (Enzyme Indigest.) | | |
|---|---|---|---|
| Oilseed Meal | Untreated | Heat Treated | Heat Treated with 1.5% ZnCl$_2$ |
| Soybean | 25.7 | 32.9 | 55.0 |
| Canola | 54.5 | 60.5 | 72.6 |
| Cottonseed | 27.0 | 37.9 | 60.5 |
| Sunflower | 13.7 | 16.5 | 57.9 |

EXAMPLE VIII

Three zinc salts were compared under the same zinc concentration (0.96% based on the meal) and at the same pH (5.01) and providing soybean meal with rumen protection (rumen by-pass). Salts tested were zinc chloride, sulfate, and acetate. Toasted soybean meal was spray blended with aqueous solutions of the zinc salts, and the samples were heat treated on trays in an autoclave at 215° C. for 10 minutes. The moist-heat treated feedstuffs were dried at 180° F. for 2 hours to final moisture contents of 5-6%. The treated products were tested by the ADIN and enzyme digestibility procedures. The results are summarized below in Table I.

TABLE I

| Treatment | Estimated % Rumen Bypass (Enzyme Indigest.) |
|---|---|
| 1. Untreated, Regular SBM | 28.2 |
| 2. Heat Treated, Regular SBM | 35.1 |
| 3. Treatment 2 + 2.0% Zinc Chloride (0.96% as zinc) | 57.4 |
| 4. Treatment 2 + 2.4% Zinc Sulfate (0.96% as zinc) | 56.6 |
| 5. Treatment 2 + 2.7% Zinc Acetate (0.96% as zinc) | 61.2 |

The foregoing tests show that the zinc salts tested are equivalent in rumen bypass capability, indicating that the zinc cation is the factor providing the rumen protection and that the salt anion has little effect. In these tests, the pH of each zinc solution was adjusted to that of the zinc chloride solution (pH 5.01) using 10% HCl or 10% NaOH to make the solutions equivalent in pH.

EXAMPLE IX

The following is an example of a control and two zinc chloride-treated pelleted dairy feeds, all having a protein content (N×6.25) of about 20%.

The basic composition of each feed was as follows:

| Component | Quantity, Lbs. |
|---|---|
| Ground corn | 113.2 |
| Standard wheat mids | 116.0 |
| Toasted soybean meal | 102.8 |
| Lignin sulfate | 15.2 |
| Ground limestone | 3.7 |
| Calcium sulfate | 3.3 |
| Magnesium Oxide | 1.0 |
| Sodium bicarbonate | 6.0 |
| Fat | 6.8 |
| Molasses | 31.2 |
| Micro mineral and vitamin mix | 0.636 |

In preparation of the control batch (no treatment), the ingredients, with the exception of the fat and molasses, were mixed in a vertical twin screw mixer. The mixer was run for six minutes prior to the addition of the fat and molasses. Mixing was continued for a total of 12 minutes. The mixture was then dropped to a supply bin for the steam conditioner. The feeder rate to the conditioner was set at 23 (on a scale of 1-50). The conditioning was done by direct steam addition through a steam control valve set at 1.1 turns (steam pressure—36 lbs.). The pelleting proper was done with a pellet mill using a 11/64"×2¼" die. The mix temperature to the conditioner was about 74° F., and to the die, about 128° F. In the die further heating occurred increasing the temperature of the mix an estimated 20° to 30° F., that is, to 148° to 158° F. The pellets were then conveyed to a vertical cooler and then to a bin wherein the pellets were within 15° F. of ambient temperature.

Two additional 400 lb. batches were made in this fashion with the exception that one was treated with 1 lb. (0.25%) of anhydrous zinc chloride, and the other with 2 lb. (0.5%) of anhydrous zinc chloride, which were added as dry powders. The conditioning steam provided moisture for partial or complete dissolving of the added zinc salt. In each instance, the zinc chloride was mixed for 10 minutes with the protein-containing ingredients (corn, wheat mids, and soybean meal) before continuing with the process described above.

Samples of these pelleted dairy feeds were crushed and examined for resistance to enzyme degradation by the ADIN and Enzyme Indigestibility procedures. Also proximate analyses and zinc analyses were run. The results are summarized below in Table J.

TABLE J

| Feed Treatment | H$_2$O % | Protein % | Fat % | Zinc ppm | % Enz. Indigest. N[a] | ADIN[b] |
|---|---|---|---|---|---|---|
| Control | 11.36 | 20.82 | 4.12 | 50 | 36.25 | 3.58 |
| 0.25% ZnCl$_2$ | 11.2 | 21.46 | 3.72 | 940 | 45.30 | 3.45 |
| 0.50% ZnCl$_2$ | 9.92 | 21.85 | 3.66 | 1719 | 59.62 | 3.34 |

[a]Enzyme insoluble nitrogen as percent of total nitrogen - indicator of extent of rumen bypass.
[b]Acid detergent insoluble nitrogen as percent of total nitrogen - indicator of amount of nitrogen (protein) completely unavailable to ruminant.

EXAMPLE X

A small herd milk production trial was carried out using the pelleted dairy feeds treated with 0.5% zinc chloride prepared as described in Example IX. The herd consisted of 31 Holstein cows of various times postpartum. The pelleted feed was fed ad libitum. Corn silage was also fed ad libitum. Further, each cow was fed alfalfa-orchard grass hay at 6 lbs./day. During the conditioning and baseline period, the cows were fed an 18% untreated protein ration for 10 days. The average milk production per cow was 58.6 lbs. per day with 4.82 ppm zinc in the milk. During the next period of 40 days, the cows were fed the zinc-treated (0.5% zinc chloride) feed, with a total protein content of 15%. The milk production averaged 58.1 lbs. per cow per day with a zinc content in the milk of 5.55 ppm. The trial ended with 27 cows because of drying off.

This trial demonstrated that milk production was not adversely affected even though feed protein content is dropped significantly (18% to 15%) if the feed is treated with zinc chloride. Further, there was no significant pass through of the zinc into the milk.

EXAMPLE XI

Another ruminant trial to study the impact of zinc salt-treated dairy feed protein concentrate on milk production was carried out.

In this trial an average of 26 Holstein cows in late lactation were used. The feeding program was divided into two phases; (a) a control phase of 30 days with non-treated feed to establish the normal milk-volume production, and (b) a phase wherein treated protein was used to determine its affect upon milk-volume production.

In each phase the cows were fed 12 pounds of alfalfa hay, and corn silage was fed ad libitum.

In phase 1, a pelleted commercially-prepared dairy concentrate containing 36 percent crude protein was mixed with corn, oat, molasses, trace minerals, and additives to produce a ration containing 14.5 percent crude protein. This was fed at an average of 20 pounds/cow/day.

In phase 2 of the feeding program, a pelleted dairy feed concentrate was prepared using zinc chloride-treated (at 1.5% level) toasted soybean meal was prepared as described in Example IX. This contained 38 percent crude protein. This was mixed with the same ingredients recited for phase 1, and such mixing resulted in a final feed containing 13.2 percent crude protein. This was fed at the same rate as in Phase 1. All other factors were the same.

The results of ruminant trial were as follows:
Phase 1: 49.2 lb milk/cow/day averaged over 30 days.
Phase 2: 51.7 lb milk/cow/day averaged over 50 days.

This trial demonstrates that the zinc salt-treated dairy feed results in increased milk production. Moreover, this is accomplished with less crude protein in the total feed; 13.2 percent vs. 14.5 percent.

I claim:

1. The method of feeding cattle to improve feed protein utilization, said cattle being selected from the group consisting of lactating dairy cattle being fed for milk production and growing beef cattle being fed for meat production, comprising:
   (a) intermixing a cattle feed composition containing at least oil seed proteinaceous meal with a ruminant-edible water-soluble zinc salt, the protein of said oil seed meal being in natural unhydrolyzed condition, said zinc salt forming zinc ions in aqueous solution and being present in an amount providing 0.25 to 1.3% zinc ions based on the dry weight of said proteinaceous meal;
   (b) conditioning the mixture thus formed by contact with steam to prepare it for pelleting;
   (c) forming the conditioned mixtures into pellets; and
   (d) feeding the pelleted composition to said cattle in amounts effective in relation to protein intake to increase their milk production for said dairy cattle or their rates of weight gain for said beef cattle.

2. The method of claim 1 in which said feed composition is composed essentially of said proteinaceous meal and said zinc salt.

3. The method of claim 1 in which said feed composition is composed of said proteinaceous meal in admixture with other feed ingredients.

4. The method of claim 1 in which said zinc salt is selected from the group consisting of zinc sulfate and zinc chloride, said zinc salt being intermixed as a dry powder or as an aqueous solution thereof.

5. The method of claim 1 in which said unhydrolyzed proteinaceous meal is selected from the group consisting of soybean meal, rapeseed meal, sunflower meal, cottonseed meal, peanut meal, safflower meal, palm kernel meal, and mixtures thereof.

6. The method of claim 1 in which said unhydrolyzed proteinaceous meal is defatted toasted soybean meal.

7. The method of feeding diary cattle to improved feed protein utilization for milk production, comprising:
   (a) intermixing a dairy cattle feed composition containing at least oil seed proteinaceous meal with a ruminant-edible water-soluble zinc salt in the form of a dry powder, said zinc salt being selected from the group consisting of zinc sulfate and zinc chloride, the protein of said oil seed meal being in natural unhydrolyzed condition, said zinc salt being present in an amount providing 0.25 to 1.3% zinc ions based on the dry weight of said proteinaceous meal;
   (b) conditioning the mixture thus obtained by contact with steam to prepare it for pelleting;
   (c) forming the conditioned composition into pellets;
   (d) feeding the pelleted composition to lactating dairy cattle in amounts effective to increase their milk production in relation to protein intake; and
   (e) continuing said feeding until the milk production of said dairy cattle is increased.

8. The method of feeding beef cattle to improve feed protein utilization for promoting growth, comprising:
   (a) intermixing a beef cattle feed composition containing at least unhydrolyzed oil seed proteinaceous meal with a ruminant-edible water-soluble zinc salt in the form of a dry powder, said zinc salt being selected from the group consisting of zinc sulfate and zinc chloride, the protein of said oil seed meal being in natural unhydrolyzed condition, said zinc salt being present in an amount providing 0.25 to 1.3% zinc ions based on the dry weight of said proteinaceous meal;
   (b) conditioning the mixture thus obtained by contact with steam to prepare it for pelleting;
   (c) forming the conditioned composition into pellets;
   (d) feeding the pelleted composition to growing beef cattle in amounts effective to increase their rates of weight gain in relation to protein intake; and
   (e) continuing said feeding until the rates of weight gain of said beef cattle are increased.

9. The method of claims 7 or 8 in which said proteinaceous meal is selected from the group consisting of soybean meal, rapeseed meal, sunflower meal, cottonseed meal, peanut meal, safflower meal, palm kernel meal, and mixtures thereof.

10. The method of claims 7 or 8 in which said proteinaceous meal is defatted toasted soybean meal.

11. The method of claims 7 or 8 in which said feed composition is composed essentially of said proteinaceous meal and said zinc salt.

12. The method of feeding cattle to improve feed protein utilization, said cattle being selected from the group consisting of lactating dairy cattle being fed for milk production and growing beef cattle being fed for meat production, comprising:
   (a) intermixing a cattle feed composition containing at least oil seed proteinaceous meal with an aqueous solution of a ruminant-edible water-soluble zinc salt, the protein of said oil seed meal being in natural unhydrolyzed condition, said zinc salt forming zinc ions in said aqueous solution and being present in an amount providing 0.25 to 1.3% zinc ions based on the dry weight of said proteinaceous meal, said aqueous solution being absorbed by said meal; and (b) feeding the mixture thus obtained to said cattle in amounts effective in relation to protein intake to increase their milk production for said dairy cattle or their rates of weight gain for said beef cattle.

13. The method of feeding lactating dairy cattle for milk production comprising:
   (a) intermixing a cattle feed composition containing at least oil seed proteinaceous meal with a ruminant-edible water-soluble zinc salt, the protein of said oil seed meal being in natural unhydrolyzed condition, said zinc salt forming zinc ions in aqueous solution and being present in an amount providing 0.25 to 1.3% zinc ions based on the dry weight of said proteinaceous meal;
   (b) conditioning the mixture thus formed by contact with steam to prepare it for pelleting;
   (c) forming the conditioned mixtures into pelleted feed; and
   (d) feeding the pelleted feed to said diary cattle in amounts effective in reducing by about 9% to about 17%, the protein fed by way of the pelleted feed and maintaining or increasing milk production.

14. In a method for feeding lactating dairy cows or growing beef cattle where a portion of the feed is pelleted oil seed proteinaceous meal containing vitamin and mineral supplements, the improvement comprising feeding said pelleted feed, which has incorporated therein during the pelleting process, a ruminant edible water soluble zinc salt wherein zinc ions from the zinc salt are present in an amount providing 0.25% to 1.3% zinc ions based on the dry weight of the proteinaceous meal.

* * * * *

UNITED STATES PATENT AND TRADEMARK OFFICE
CERTIFICATE OF CORRECTION

PATENT NO. : 4,664,905

DATED : May 12, 1987

INVENTOR(S) : Edwin W. Meyer

It is certified that error appears in the above-identified patent and that said Letters Patent is hereby corrected as shown below:

Cover page, second column, line 4, "zine" should read --zinc--
Column 1, line 19, "some" should read --some time--
Column 3, line 44, "zinz" should read --zinc--
Column 6, line 6, "fee end" should read --feed end--
         line 12, "sot" should read --so--
         line 52, "with" should read --was--
         line 55, "(approximately) two pounds)" should read --(approximately two pounds)--
Column 8, line 9, "1.0 ZnSO4" should read --1.0% ZnSO4--
         line 59, "at 0 and 1.0%" should read --at 1.0 and 2.0%--

Signed and Sealed this

Fifteenth Day of December, 1987

Attest:

DONALD J. QUIGG

*Attesting Officer*  *Commissioner of Patents and Trademarks*